United States Patent [19]

Audebert et al.

[11] Patent Number: 5,587,002
[45] Date of Patent: Dec. 24, 1996

[54] PROCESS FOR THE PREPARATION OF A COOLING AGENT CONTAINING IRON FOR A STEEL-MAKING CONVERTER

[75] Inventors: Serge Audebert, Bellegarde; Francis Audibert, Saint Martin de Crau, both of France

[73] Assignee: Sollac, Puteaux, France

[21] Appl. No.: 981,425

[22] Filed: Nov. 25, 1992

(Under 37 CFR 1.47)

[30] Foreign Application Priority Data

Nov. 26, 1991 [FR] France ................... 91 14590

[51] Int. Cl.⁶ ............................. C22B 1/243; C22B 1/244
[52] U.S. Cl. ......................... 75/770; 75/772; 75/962
[58] Field of Search .................. 75/766, 767, 714, 75/325, 770, 772, 962

[56] References Cited

U.S. PATENT DOCUMENTS

| | | | |
|---|---|---|---|
| 2,842,434 | 7/1958 | Kippe | 75/766 |
| 4,123,257 | 10/1978 | Fukuoka | 75/766 |
| 4,209,323 | 6/1980 | Echterhoff | 75/325 |
| 4,294,610 | 10/1981 | Burton | 75/325 |
| 4,326,883 | 4/1982 | Schwarz . | |
| 4,369,062 | 1/1983 | Strange . | |
| 4,585,475 | 4/1986 | Fosnacht . | |
| 4,711,662 | 12/1987 | Harada | 75/766 |
| 5,100,464 | 3/1992 | Kelly et al. | 75/321 |

FOREIGN PATENT DOCUMENTS

| | | |
|---|---|---|
| 0069621 | 8/1968 | Germany . |
| 69621 | 8/1968 | Germany . |
| 2942899C2 | 10/1979 | Germany . |
| 0031715 | 12/1984 | Germany . |
| 252393A1 | 8/1986 | Germany . |
| 0252393 | 8/1986 | Germany . |
| 3923552A1 | 7/1989 | Germany . |
| 3923552 | 7/1989 | Germany . |
| 4101584A1 | 1/1991 | Germany . |

OTHER PUBLICATIONS

Erzeugung und Verarbeitung armierter Filterstaubbriketts aus der Edelstahlerzeugung, Stahl u. Eisen 104 (1984) Nr. 7.
Patent Abstracts Of Japan, vol. 3, No. 27, (C–39)(138) 7 Mars 1979 & JP–A–54 004 214 (Sumitomo Kinzoku) 12 Janvier 1979.
Patent Abstract Of Japan vol. 3 No. 27 (C–39)(138) Mar. 7, 1979 & JP–A–54 004 214 (Sumitomo Kinzoku) Dec. 1, 1979.

*Primary Examiner*—Melvyn Andrews
*Attorney, Agent, or Firm*—Oblon, Spivak, McClelland, Maier & Neustadt, P.C.

[57] ABSTRACT

The present invention relates to a process for the preparation of a cooling agent containing iron for refining steel in a steel-making converter. The cooling agent is formed from ovoids produced from fatty slurries from rolling mills.

The present invention also relates to a cooling agent which contains iron and is obtained by this process.

8 Claims, No Drawings

PROCESS FOR THE PREPARATION OF A COOLING AGENT CONTAINING IRON FOR A STEEL-MAKING CONVERTER

The present invention relates to a process for the preparation of a cooling agent containing iron refining steel in a steel-making converter.

The present invention also relates to a cooling agent which contains iron and is produced by this process.

In integrated iron-and-steel works, the rolling operations and in particular the hot rolling operation, require the use of lubricant oil as well as cooling water.

The unburnt oil and the scale mix and are entrained by the cooling water towards the sand filters placed in the water-recovery circuit.

When these filters are too clogged, they washed counter currentwise with water, thus producing fatty rolling mill slurries in which the residues containing iron are polluted with hydrocarbons originating from the oil.

These fatty slurries which are recovered in an amount of 1000 tons per month in some steelworks, are stored in a pond and are never used.

Moreover, these fatty slurries infiltrate into the soil in the course of the and pollute the ground water tables.

Taking into account the disadvantages inherent in the storage of fatty rolling mill slurries and the non-use of this product containing iron, the Applicant has carried out a number of revalorisation experiments and has discovered, completely unexpectedly, that these slurries may be used in a steel-making converter as cooling agent, after having been subjected to an appropriate treatment.

The present invention thus relates to a for the prepazation of a cooling agent containing characterized in that the said agent is formed from ovoids produced from fatty rolling mill slurries and that:

- lime, iron ore, slag and metal fibrils are added to the extracted fatty rolling mill slurries in order to obtain a mixture which has the following composition by weight:
  - fatty slurries: 55 to 93%
  - lime: 5 to 25%
  - metal fibrils: 5 to 15%
  - iron ore: 1 to 15%
  - slag: 1 to 15%
- the said mixture is covered and allowed to stand with a view to slaking of the lime,
- the mixture obtained is homogenised,
- 4 to 10% of binder is added,
- and the said mixture is compacted in order to form the ovoids.

According to other characteristics of the invention:

- the ovoids have the general shape of ellipsoids, having a length of between 20 and 60 mm and a thickness of between 10 and 25 mm,
- the metal fibrils have a maximum length of about 5 mm and an average diameter of about 0.3 mm,
- the metal fibrils are slivers resulting from machining operations such as grinding,
- the metal fibrils contain iron, and
- the composition, by weight, of the mixture is preferably as follows.
  - fatty slurries: 76 to 80%
  - lime: 10 to 12%
  - metal fibrils: 7 to 12%
  - iron ore: 1 to 6%
  - slag 1 to 6%

The present invention also relates to a cooling agent which contains iron and is produced by the above-mentioned process, characterised in that it contains, by weight:

- at least 50 to 67% of iron
- from 8 to 18% of lime
- less than 0.2% of sulphur
- less than 7% of carbon, and
- less than 10% of residues in alkaline and mineral form, the iron being present in the free form and in the form of oxides.

The description which follows, which is given by way of a nonlimiting example, will enable the invention to be better understood and the advantages and the characteristics of the invention to be emphasized.

In a steel-making converter, steel refining is carried out in order to produce a raw steel having characteristics which show little scatter around the desired values, that is to say limiting values for the content of impurities such as phosphorus or sulphur, for example, a minimum temperature compatible with the grading and a casting temperature in a continuous casting machine and, in addition, a carbon content.

When the liquid cast iron and the scrap iron are charged into the converter, about 15000 $m^3$ of oxygen are blown in for several minutes using a blast pipe with a view to producing the steel.

At the beginning of the stage when oxygen is blown in, the lime is charged and reacts with the oxygen and with the elements present in the cast iron, such as, for example, silicon, phosphorus and manganese, in order to form slag or what is termed converter cinder.

After charging the lime, a cooling agent, which conventionally is an ore which is termed blowing ore and contains about 67% of iron in the form of oxides and which is involved in the energy balance for the refining, is charged under gravity.

The process according to the invention comprises preparing a cooling agent which contains iron and is formed from ovoids produced from fatty rolling mill slurries.

This agent is intended partially to replace the conventional blowing ore and it is intended, for example, to replace 3 tons of ore by 4.5 tons of agent according to the invention in order to satisfy the energy balance and to obtain a predetermined steel composition and temperature.

The free carbon in the form of hydrocarbon must be present in the agent in proportions which do not exceed 7%, in order to eliminate the risk of conversion of the hydrogen atoms in the hydrocarbon chains originating from the fatty rolling mill slurries into gas molecules.

In fact, the presence of a volume of hydrogen gas in the converter, and therefore in the capture flue arranged above it, may give rise to explosions of considerable force.

The cooling agent containing iron according to the present invention is produced from fatty rolling mill slurries stored in a pond.

The first step in the production process comprises extracting these slurries and incorporating therein adjuvants which will convert them and give them specific properties.

Thus, quicklime, for example, is added in order to dry the slurries and to remove the oil therefrom.

The role of the lime is to reduce the moisture content to about 4 to 5% at most.

Given that the chemical reaction is exothermic, the temperature being close to 80° C., a fraction of the hydrocarbons is thus removed by evaporation, the other fraction being fixed on the lime.

An excess of lime may give rise to bursting of the ovoids of the agent containing iron, thus substantially preventing the penetration of the said product into the liquid converter bath, which has the effect of disrupting steel production, since it results in a steel having a temperature higher than envisaged.

To this end, it is expedient to add no more than 25% of lime.

The partial oil removal by the addition of lime becomes effective in amounts of from 5%.

1 to 15% of iron ore, preferably 1 to 6%, in the form of a powder having a particle size distribution of less than 5 mm in its totality, and also 1 to 15%, preferably 1 to 6%, of slag which has been obtained from the converter and retreated are also added.

The slag is fines having a size of less than 3.14 mm.

The mixture thus formed contains 55 to 93%, preferably 76 to 80%, of fatty slurries, by weight.

The Applicant has also found that the ovoids produced from fatty rolling mill slurries, lime and, where appropriate, iron ore and slag do not have adequate cohesion.

Because of this, during charging of the ovoids into the converter, the said ovoids are in contact with intense heat, the temperature prevailing in the converter chamber being in the region of 1500° C., and, due to a lack of cohesion, disintegrate before they enter into the bath of liquid cast iron, producing a considerable amount of fines.

The fines are then drawn into the capture flue and are deposited on the walls of the said flue, thus giving rise to clogging of the latter.

These fines which are drawn in also represent a portion of cooling agent which is not negligible and which does not participate in the energy balance of the converter and therefore has no thermal efficiency.

To this end, the Applicant has discovered, surprisingly, that the addition of 5 to 15% and preferably of 5 to 12% of metal fibrils to the abovementioned mixture confers better cohesion to the ovoids and enables the proportion of fines in the ovoids to be reduced by about 30%, thus delaying the disintegration of the said ovoids during their charging into the converter. The metal fibrils have a maximum length of about 5 mm and an average diameter of about 0.3 mm.

In fact, for dimensions greater than those mentioned above it is found that the ovoids no longer have the desired cohesion.

These fibrils are metal slivers resulting from a machining operation, such as, for example, grinding, and may contain iron.

These metal slivers containing iron are, for example, composed of stainless steel, but they may also be composed of steel of any other type, such as, for example, mild steel.

The metal chosen is not restricted to steel and may, for example, be aluminium or any other metal.

The mixture obtained is then covered and left to stand for about 1 week. This step has the purpose of slaking the lime and also plays a role in increasing the mechanical strength of the mixture over time.

This rest time is variable, depending on the contents used in the mixture, from several days to up to 3 weeks.

When the mixture has rested, it is homogenised in a malaxator.

The last but one step relates to the addition of binder in proportions of between 4 and 6% and preferably of 5%.

The binder chosen is cane molasses, which adds on the mixture by creating mobile liquid bonds and then, after drying, solid bridges which stick the grains of the said mixture to one another.

The binder thus contributes to improving the mechanical strength of the cooling agent.

After drying, the mixture contains less than 2% of water.

Binders such as ammonium lignosulphonate and calcium lignosulphonate may also be used.

The shaping of the cooling agent containing iron according to the present invention is the final step in its production and takes place in a compacting press under a pressure of 400 to 500 bar.

Ovoids are thus formed, which have the shape of ellipsoids having dimensions such that the length is between 20 and 60 mm and the thickness is between 10 and 25 mm.

The shape used for the cooling agent is the most suitable for its routing towards the converter.

In fact, when the cooling agent is routed towards the converter with the aid of conveyor belts, the latter are often inclined to such an extent that a cooling agent produced in the form of spheres is not suitable.

It should also be noted that a cooling agent produced in the form of a briquette or parallelepiped is not more suitable for this routing, taking into account the fact that it has sharp edges which are not well able to withstand impacts and that it breaks up fairly easily during transport to the converter, which is not the case with the very compact ovoids of the present invention.

The size of the ovoids, their density and their mechanical strength enable them to enter the liquid bath easily during their charging into the converter, thus promoting the reaction with the liquid metal.

The mechanical strength of the ovoids is also considerably increased by the addition of the metal fibrils.

In fact, the Applicant has been able to establish that the ovoids produced without metal fibrils had a mechanical compressive strength of the order of 25 kgf, whereas those produced with the said metal fibrils had a mechanical compressive strength of the order of 85 kgf.

The cooling agent containing iron according to the present invention has, for example, the following chemical composition:

52% of iron in the free form and in the form of oxides, 9.8% of lime 0.08% of sulphur and 6.5% of carbon the remainder comprising at least 10% of residues in alkaline and mineral form.

It should be noted that the sulphur content must be less than 0.2% because of the fact that steel metallurgists experience difficulty in removing an excess of sulphur from the steel in the converter.

The present invention therefore makes it possible to revalorise the residues containing iron present in the fatty rolling mill slurry stored in a pond for several years, as well as those produced daily on rolling mill lines.

The removal of these slurries from the pond also eliminates the risks of pollution of the groundwater tables.

In addition to these advantages, the invention makes it possible to carry out refining under the best economic conditions possible, by lowering the cost of the ore charge to the converter.

Experiments have been carried out on ovoids without fibrils and with fibrils in order to quantify the effect of the addition of the said fibrils on the proportion of fines in the said ovoids.

The ovoids designated A were first produced and shaped from the following composition, in accordance with the process described above, without the addition of fibrils:

fatty slurries: 77,1% lime: 10,5 % iron ore: 4,2 % slag: 4,2 % binder: 4 % and the ovoids designated B were then produced by adding 10% of fibrils to the above mixture. These fibrils are stainless steel slivers having a maximum length of 5 mm and an average diameter of 0.3 mm, resulting from a grinding operation.

The new mixture therefore has the following composition:

fatty slurries lime fibrils: 9,2 % iron ore: 3,8 %
slag: 3,8 %
binder: 4 %

In each of the two abovementioned cases A and B, 150 kg of ovoids 60 mm long and 25 mm thick were produced.

For each case A and B, a test known as the MICUM test was carried out on 15 kg of cooling agent.

The aim of such a test is to determine the generation of fines during passage of the ovoids over a MICUM drum.

This drum simulates the degradation to which the material is subjected during the various handling operation.

The MICUM test is carried out in accordance with an ISO standard and comprises, successively, for each case A and B:

depositing 15 kg of cooling agent produced in the form of ovoids on a wheel provided with a peripheral angle 50 mm wide and rotating at a speed of 200 revolutions per minute for 5 minutes. During rotation of the wheel, some of the ovoids disintegrate and are recovered in the angle, collecting the remaining ovoids and the disintegrated portion recovered in the angle and screening them in a conventional manner on screens having circular meshes of successive diameters 60, 40, 20, 20, 5 and 3.14 mm.

The aim of this test is to obtain the particle size distribution of the ovoids and thus to evaluate the amount of fines present in the said ovoids.

Thus, after the first test the results given in Table 1 below are obtained:

TABLE 1

| PARTICLE SIZE DISTRIBUTION | | PROPORTIONS BY WEIGHT | |
|---|---|---|---|
| | | Case A | Case B |
| | < 3.14 mm | 6.2% | 4.1% |
| 3.14 < | < 5 mm | 13.8% | 11.2% |
| 5 < | < 10 mm | 25.2% | 25.4% |
| 10 < | < 20 mm | 35.6% | 35.9% |
| 20 < | < 40 mm | 12.9% | 13.9% |
| 40 < | < 60 mm | 5.2% | 7.1% |
| 60 mm < | | 1.1% | 2.4% |

The 135 kg of cooling agent which were not subjected to this test were then exposed, in the two cases A and B, to a temperature of between 950° and 1020° C. for a period of 5 min in an agglomeration furnace.

A MICUM test was then carried out, 24 hours later in each case, on 15 kg of ovoids which had been subjected to the above heat treatment.

The results of this second test are expressed in Table 2 below:

| PARTICLE SIZE DISTRIBUTION | | PROPORTIONS BY WEIGHT | |
|---|---|---|---|
| | | Case A | Case B |
| | < 3.14 mm | 28.4% | 17.3% |
| 3.14 < | < 5 mm | 34.6% | 20.1% |
| 5 < | < 10 mm | 17.9% | 43.6% |
| 10 < | < 20 mm | 9.4% | 10.1% |
| 20 < | < 40 mm | 8.9% | 3.9% |
| 40 < | < 60 mm | 0.8% | 0% |
| 60 mm < | | 0% | 0% |

These results thus make it possible to establish that the addition of stainless steel fibrils to the cooling agent ovoids reduces the proportion of fines, that is to say dust of a size smaller than 3.14 mm, by about a third and improves the cohesion of the ovoids.

The addition of metal fibrils of specific dimensions therefore make it possible, during charging of the ovoids into the converter, to increase the cohesion of said ovoids because of their better thermal conductivity and, thus, to delay the disintegration phenomenon, which enables a much greater proportion of the ovoids to reach the liquid metal bath and thus to participate in the heat balance by acting as cooling agent.

We claim:

1. A process for the preparation of a cooling agent containing iron, comprising the steps of:

adding quicklime, iron ore, slag and metal fibrils to extracted fatty rolling mill slurries present in a container in order to obtain mixture A which comprises more than 5% water, hydrocarbons and contains the following components in percent by weight:

fatty slurries: 55 to 93%
lime: 5 to 25%
metal fibrils: 5 to 15%
iron ore: 1 to 15%
slag: 1 to 15% covering said container containing mixture A and allowing mixture A to stand for a time sufficient for slaking of said lime, reduction of the water content to 4–5% and reduction of the hydrocarbon content, homogenizing mixture A, adding 4 to 10% of binder to said mixture A to produce mixture B, compacting said mixture B in order to form ovoids.

2. The process according to claim 1, wherein the ovoids have the general shape of ellipsoids having a length of between 20 and 60 mm and a thickness of between 10 and 25 mm.

3. The process according to claim 1, wherein the metal fibrils have a maximum length of about 5 mm and an average diameter of about 0.3 mm.

4. The process according to claim 1, wherein the metal fibrils are slivers resulting from machining operations.

5. The process according to claim 1, 2, 3 or 4 wherein the metal fibrils contain iron.

6. The process according to claim 1, wherein mixture A is as follows:

fatty slurries: 76 to 80%
lime: 10 to 12%
metal fibrils: 7 to 12%
iron ore: 1 to 6%
slag: 1 to 6%.

7. The process according to claim 1, wherein 4 to 6% of binder are added.

8. The process according to claim 1, wherein the binder is selected from the group consisting of cane molasses, ammonium lignosulphonate and calcium lignosulphonate.

* * * * *